United States Patent
Kobayashi et al.

(10) Patent No.: US 9,557,167 B2
(45) Date of Patent: Jan. 31, 2017

(54) THREE-DIMENSIONAL-SHAPE MEASUREMENT APPARATUS, THREE-DIMENSIONAL-SHAPE MEASUREMENT METHOD, AND NON-TRANSITORY COMPUTER-READABLE STORAGE MEDIUM

(71) Applicant: CANON KABUSHIKI KAISHA, Tokyo (JP)

(72) Inventors: Toshihiro Kobayashi, Tokyo (JP); Tomoaki Higo, Tokyo (JP); Masayoshi Yamasaki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 85 days.

(21) Appl. No.: 14/593,341

(22) Filed: Jan. 9, 2015

(65) Prior Publication Data
US 2015/0204662 A1    Jul. 23, 2015

(30) Foreign Application Priority Data
Jan. 17, 2014 (JP) ................................. 2014-007271

(51) Int. Cl.
*G01B 11/25* (2006.01)

(52) U.S. Cl.
CPC ........... *G01B 11/25* (2013.01); *G01B 11/2513* (2013.01)

(58) Field of Classification Search
CPC ..... G01B 11/2513; G01B 11/25; G01B 11/22; G01B 11/254; H04N 13/0275
USPC ....................... 356/600–640; 348/46, 47, 136
See application file for complete search history.

(56) References Cited

U.S. PATENT DOCUMENTS

| | | | | |
|---|---|---|---|---|
| 5,848,188 | A | * | 12/1998 | Shibata .............. G01B 11/2518 348/132 |
| 2002/0164066 | A1 | | 11/2002 | Matsumoto |
| 2007/0031029 | A1 | | 2/2007 | Sasaki |
| 2007/0211259 | A1 | | 9/2007 | Jeon et al. |

(Continued)

FOREIGN PATENT DOCUMENTS

| | | |
|---|---|---|
| JP | 2006-058091 A | 3/2006 |
| JP | 2008-281399 A | 11/2008 |

(Continued)

OTHER PUBLICATIONS

J. Salvi et al.; "Pattern codification strategies in structured light systems"; Pattern Recognition 37, 2004, S.827-849.

(Continued)

*Primary Examiner* — Sang Nguyen
(74) *Attorney, Agent, or Firm* — Carter, DeLuca, Farrell & Schmidt, LLP

(57) ABSTRACT

A first image of a space onto which a first light pattern formed from bright and dark portions and a coordinate-detection pattern projected onto each region of the space divided by the first pattern have been projected is acquired. A second image is acquired of the space onto which a second light pattern having a boundary position between bright and dark portions that is different from that of the first pattern, and a coordinate-detection pattern projected onto each region of the space divided by the second pattern have been projected. One of the first image and the second image is selected to perform three-dimensional shape measurement of an object included in the space based on the selection image.

18 Claims, 11 Drawing Sheets

(56) References Cited

U.S. PATENT DOCUMENTS

| | | | |
|---|---|---|---|
| 2010/0239150 A1* | 9/2010 | Ishikawa | A61B 5/0095 |
| | | | 382/131 |
| 2012/0089364 A1 | 4/2012 | Takabayashi | |
| 2012/0133954 A1 | 5/2012 | Takabayashi et al. | |
| 2012/0154540 A1* | 6/2012 | Tsuyuki | G01B 11/25 |
| | | | 348/46 |
| 2012/0253171 A1* | 10/2012 | Ishikawa | G06T 7/0028 |
| | | | 600/411 |
| 2012/0316820 A1* | 12/2012 | Nakazato | G01B 11/25 |
| | | | 702/94 |
| 2012/0330140 A1* | 12/2012 | Yonezawa | A61B 3/1225 |
| | | | 600/425 |
| 2013/0076896 A1* | 3/2013 | Takabayashi | G01B 11/25 |
| | | | 348/136 |
| 2013/0141544 A1* | 6/2013 | Tsuyuki | H04N 13/0253 |
| | | | 348/47 |
| 2013/0293684 A1 | 11/2013 | Becker et al. | |
| 2013/0329018 A1 | 12/2013 | Gordon et al. | |
| 2014/0168662 A1* | 6/2014 | Takabayashi | G01B 11/2513 |
| | | | 356/610 |
| 2014/0285816 A1* | 9/2014 | Yamazaki | G01B 11/2509 |
| | | | 356/610 |
| 2014/0293009 A1* | 10/2014 | Nakazato | H04N 13/0253 |
| | | | 348/46 |

FOREIGN PATENT DOCUMENTS

| | | |
|---|---|---|
| JP | 2012-251893 A | 12/2012 |
| WO | 2006/109308 A1 | 10/2006 |
| WO | 2011/013373 A1 | 2/2011 |
| WO | 2012/002152 A1 | 1/2012 |
| WO | 2012/081506 A1 | 6/2012 |

OTHER PUBLICATIONS

German Office Action issued in corresponding application No. 102015000386.0 on Sep. 23, 2015.

Chen et al., "Modulated phase-shifting for 3D scanning", CVPR 2008, pp. 1-8.

Furuse et al., "Robust 3-D Shape Measurement Method by Modulated Slit Light Against Interreflection and Subsurface Scattering", Meeting on Image Recognition and Understanding, Jul. 2009, pp. 1-8.

Great Britain Search Report issued in corresponding application No. 1500627.3 on May 21, 2015.

* cited by examiner

GRAY CODE PATTERN MASK

SHIFT GRAY CODE PATTERN MASK

THREE-DIMENSIONAL-SHAPE MEASUREMENT APPARATUS, THREE-DIMENSIONAL-SHAPE MEASUREMENT METHOD, AND NON-TRANSITORY COMPUTER-READABLE STORAGE MEDIUM

BACKGROUND OF THE INVENTION

Field of the Invention

The present invention generally relates to a three-dimensional-shape measurement apparatus, a three-dimensional-shape measurement method, and a non-transitory computer-readable storage medium, particular to a technique for measuring the three-dimensional shape of a measurement target object.

Description of the Related Art

There is widely known a three-dimensional measurement apparatus that obtains three-dimensional coordinates by the triangulation principle based on a position where an image capturing unit observes reflection light when a projection unit such as a projector projects a striped pattern typified by a space encoding method or the like onto a measurement target. With such an apparatus, the measurement accuracy of three-dimensional coordinates largely depends on the material of a measurement target.

In general, as for a measurement target made of a material such as a plastic or the like, the measurement accuracy deteriorates or the measurement itself becomes impossible due to a phenomenon called subsurface scattering or internal scattering. At the time of measurement of such a target, processing of the target, for example, by applying in advance a white powder or the like to the surface of the target is required, thereby considerably limiting the application possibilities of the three-dimensional measurement apparatus.

Patent literature 1 (Japanese Patent Laid-Open No. 2008-281399) discloses a method of accurately measuring the three-dimensional shape of a translucent object to be measured by providing a linearly polarizing plate on an optical path to separate surface-reflection light and internal scattered light.

Patent literature 2 (Japanese Patent Laid-Open No. 2012-251893) discloses a method of estimating the reflection-position coordinates of an object by projecting, in advance, a pattern onto a measurement target to acquire a reference luminance pattern, and comparing a luminance pattern observed at the time of measurement with the reference luminance pattern. This method is not limited to a translucent object, and it is possible to perform three-dimensional shape measurement at high accuracy regardless of the reflection characteristic of an object.

Non-patent literature 1 (Tongbo Chen, Hans-Peter Seidel, Hendrik P. A. Lensch, Modulated phase-shifting for 3D scanning, CVPR 2008) proposes a three-dimensional-shape measurement method which is hardly influenced by internal scattering by modulating a sinusoidal pattern in a phase shift method by a high-frequency, sinusoidal pattern.

Non-patent literature 2 (Tatsuhiko Furuse, Shinsaku Hiura, and Kosuke Sato, "3-D Shape Measurement Method with Modulated Slit Light Robust for Interreflection and Subsurface Scattering", MIRU2009, Meeting on Image Recognition and Understanding) proposes a three-dimensional-shape measurement method which is hardly influenced by internal scattering by modulating slit light by an M-sequence including high frequency components.

In the method described in patent literature 1, however, the geometric relationship among a light source, light-receiving unit, and a measurement target surface needs to satisfy a given condition to separate surface-reflection light and internally-scattered light using polarization. Performing the measurement so as to satisfy the condition can be difficult.

In the method described in patent literature 2, the waveform of the luminance pattern depends on a number of parameters such as the shape of the target object and the geometric relationship between a light source and a light-receiving unit, in addition to the material of the measurement target object. To measure a wide range of objects, therefore, it is necessary to acquire, in advance, an enormous number of reference luminance patterns to cover many combinations.

Similarly, in the methods described in non-patent literatures 1 and 2, it is necessary to perform shooting by projecting a number of patterned light beams in order to measure the overall target object, resulting in a long measurement time.

SUMMARY OF THE INVENTION

It is desirable to solve the above problems, such as by providing a three-dimensional-shape measurement technique for stably performing three-dimensional measurement at high accuracy in a general measurement environment without requiring an enormous amount of advance preparation for a measurement target including a translucent portion.

According to the first aspect of the present invention, there is provided a three-dimensional-shape measurement apparatus comprising: a first acquisition unit configured to acquire a first captured image of a space onto which a first light pattern formed from a bright portion and a dark portion has been projected; a second acquisition unit configured to acquire a second captured image of the space onto which has been projected a second light pattern formed from a bright portion and a dark portion and having a boundary position between the bright portion and the dark portion that is different from that of the first pattern; a selection unit configured to select, for each of at least one predetermined region of the first captured image or the second captured image, based on a luminance value in the first captured image and a luminance value in the second captured image, one of the first captured image and the second captured image containing the at least one predetermined region as a selection image to be used for three-dimensional-shape measurement; and a measurement unit configured to perform three-dimensional-shape measurement of an object included in the space based on the selection image selected by the selection unit.

According to the second aspect of the present invention, there is provided a three-dimensional-shape measurement method comprising: a first acquisition step of acquiring a first captured image of a space onto which a first light pattern formed from a bright portion and a dark portion has been projected; a second acquisition step of acquiring a second captured image of the space onto which a second light pattern has been projected formed from a bright portion and a dark portion and having a boundary position between the bright portion and the dark portion that is different from that of the first pattern; a selection step of selecting, for each predetermined region of the first captured image or the second captured image, based on a luminance value in the first captured image and a luminance value in the second captured image, one of the first captured image and the second captured image as a selection image to be used for three-dimensional shape measurement; and a measurement step of performing three-dimensional shape measurement of an object included in the space based on the selection image selected in the selection unit.

According to the third aspect of the present invention, there is provided a non-transitory computer-readable storage medium storing a computer program for causing a computer to function as first acquisition unit configured to acquire a first captured image of a space onto which a first light pattern formed from a bright portion and a dark portion has been projected; second acquisition unit configured to acquire a second captured image of the space onto which has been projected a second light pattern formed from a bright portion and a dark portion and having a boundary position between the bright portion and the dark portion, that is different from that of the first pattern; selection unit configured to select, for each predetermined region of the first captured image or the second captured image, based on a luminance value in the first captured image and a luminance value in the second captured image, one of the first captured image and the second captured image as a selection image to be used for three-dimensional shape measurement; and measurement unit configured to perform three-dimensional shape measurement of an object included in the space based on the selection image selected by the selection step.

Further features of the present invention will become apparent from the following description of exemplary embodiments (with reference to the attached drawings).

DESCRIPTION OF THE EMBODIMENTS

Embodiments of the present invention will be described below with reference to the accompanying drawings. Note that the embodiments to be explained below are merely examples of when the present invention is practically implemented, and are practical examples of an arrangement set forth in the following claims.

First Embodiment

In this embodiment, a space-division pattern intended to cause hardly any encoding error is projected into a measurement space to divide the measurement space including a measurement target object into a predetermined number of regions. Then, the three-dimensional shape of the measurement target object (the three-dimensional coordinates of the surface of the measurement target object) is precisely calculated by projecting a coordinate-detection pattern unique for each divided region.

Figure 1:
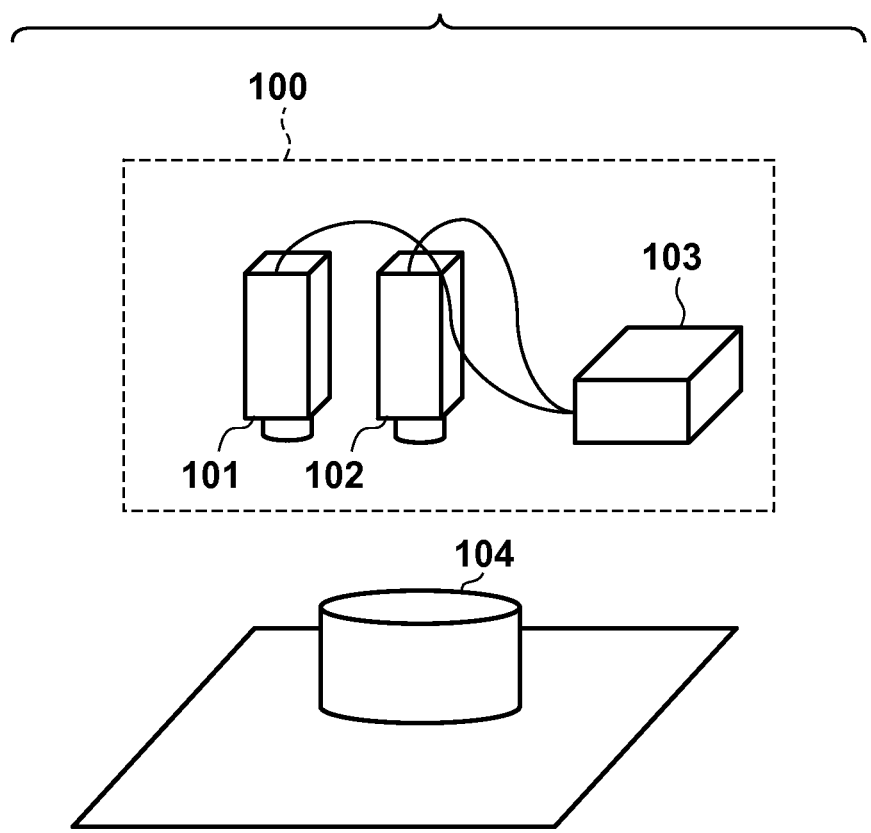
FIG. 1 illustrates an example of the configuration of a system.

An example of the configuration of a system according to this embodiment will be described with reference to FIG. 1. A system 100 according to this embodiment includes a projection unit 101 for projecting patterned light onto a measurement target object 104, an image-capturing unit 102 for capturing an image of the measurement target object 104 onto which the patterned light has been projected, and a control apparatus 103 for performing three-dimensional-shape measurement of the measurement target object 104.

An example of the functional arrangement of the control apparatus 103 functioning as a three-dimensional-shape measurement apparatus and its peripheral devices (the projection unit 101 and the image capturing unit 102) will be described with reference to a block diagram shown in FIG. 2.

The projection unit 101 projects patterned light based on a pattern supplied from a projection pattern generation unit 202 (this step to be also simply referred to as "the projection unit 101 projects a pattern" hereinafter). In this embodiment, the projection target of the patterned light projected by the projection unit 101 is a space including the measurement target object 104, the latter of which is to undergo three-dimensional-shape measurement. The projection unit 101 serves as a projector with a resolution of 128 pixels in the horizontal direction. This is merely an example for a practical description, and the essence of the following description is not limited to this.

The image-capturing unit 102 captures an image of the space including the measurement target object 104 onto which the patterned light has been projected by the projection unit 101, and in particular captures light reflected by the surface of the measurement target object 104. The image-capturing unit 102 sends the captured image to an image-input unit 204 of the control apparatus 103.

As will be described later, the projection unit 101 projects various kinds of patterned light onto the measurement target object 104, and the image capturing unit 102 captures the image of the space including the measurement target object 104 every time patterned light is projected. That is, projection of patterned light by the projection unit 101 is synchronized with capturing of the image of the space by the image-capturing unit 102, and thus the image-capturing unit 102 captures an image when each patterned light beam is projected. A control unit 210 of the control apparatus 103 performs control processing (processing of controlling the projection unit 101 and the image capturing unit 102 so that projection of patterned light is synchronized with the capture of the measurement target object 104 image). That is, the image-capturing unit 102 receives an image-capturing control signal sent by the control unit 210, and captures an image at a predetermined shutter speed, f-number, and focus position based on the reception timing. The control unit 210 controls the projection unit 101 and the images-capturing unit 102 to execute projection and image capture in synchronism with each other by sending control signals to the projection unit 101 and the image-capturing unit 102 at the same time or at least by sending control signals with synchronism information.

The projection-pattern-generation unit 202 generates a pattern to be supplied to the projection unit 101. In this embodiment, the pattern is formed from a space-division pattern and a coordinate-detection pattern. For the sake of simplicity, it is assumed that the space-division pattern and the coordinate-detection pattern are patterns of the same size.

The space-division pattern is a pattern which is projected by the projection unit 101 in order to divide a space defined by light projectable by the projection unit 101 (the space including the measurement target object 104) into a plurality of regions and to identify and specify each pattern in the coordinate-detection pattern.

The coordinate-detection pattern is a pattern which is projected by the projection unit 101 together with the space-division pattern in order to measure the three-dimensional shape of the measurement target object 104 in more detail.

Figure 3:
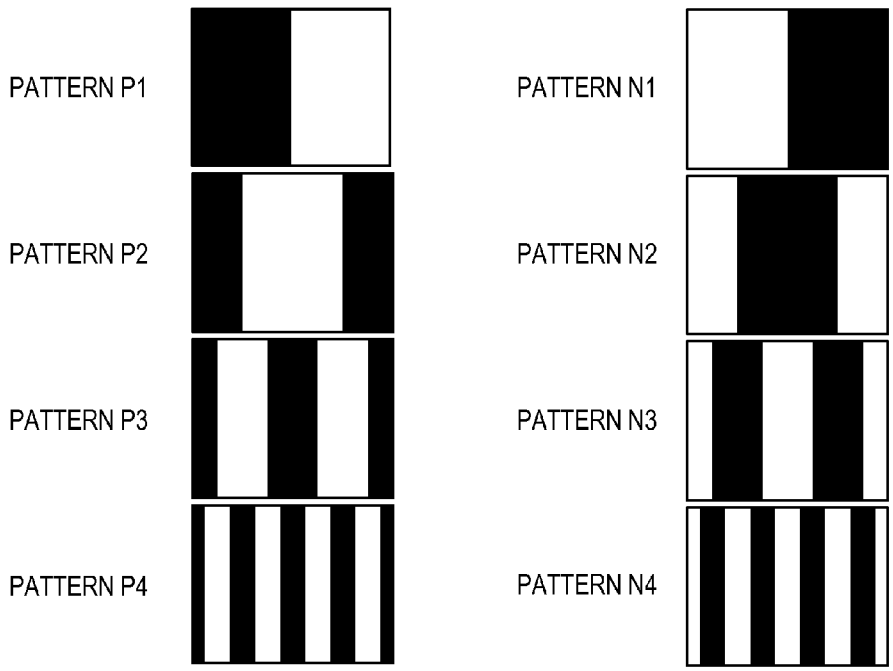
FIG. 3 illustrates examples of space-division patterns.

FIG. 3 shows examples of the space-division pattern. On the left side of FIG. 3, patterns (Gray codes) P1 to P4 are illustrated in each of which a bright portion and a dark portion are alternately arranged and in which arrangement patterns of the bright and dark portions are different (i.e. the boundary positions between the bright and dark portions are different). The patterns P1 to P4 may be referred to as positive patterns (non-inverted patterns).

The projection unit 101 sequentially projects the patterns P1 to P4 (together with the coordinate-detection pattern) onto the measurement target object 104. Every time each of the patterns P1 to P4 is projected, the image-capturing unit 102 performs image capture. With this processing, the captured image of the measurement target object 104 onto which the pattern P1 has been projected and the captured image of the measurement target object 104 onto which the pattern P2 has been projected are obtained. Furthermore, the captured image of the measurement target object 104 onto which the pattern P3 has been projected and the captured image of the measurement target object 104 onto which the pattern P4 has been projected are obtained. There exist 16 ($2^4$) combinations of bright and dark portions on the four captured images. When the entire space onto which the projection unit 101 projects the pattern is divided into 16 regions, it is possible to decide a region to which each position on the captured images belongs. This is equivalent to specifying a portion of the pattern image projected by projection unit 101 which illuminates each pixel of the pattern images. The resolution in the horizontal direction of the projection unit 101 is 128 pixels. In this case, therefore, a region is specified every 8 pixels obtained by dividing the 128 pixels by 16.

When the aforementioned four captured images are obtained, an image-processing unit 205 assigns, to each pixel position on the captured image (any one of the above four captured images), a code obtained by aligning bits each indicating which of a bright portion and dark portion is included at the pixel position of each of the four captured images. For example, a bright portion may be included at a pixel position (x, y) in the captured image of the measurement target object 104 onto which the pattern P1 has been projected, whereas a dark portion may be included at the same pixel position (x, y) in the captured image of the measurement target object 104 onto which the different pattern P2 has been projected. Similarly, a bright portion may be included at the pixel position (x, y) in the captured image of the measurement target object 104 onto which the pattern P3 has been projected, and a dark portion may then be included at the pixel position (x, y) in the captured image of the measurement target object 104 onto which the pattern P4 has been projected. A bit "1" is assigned to a pixel position where a bright portion is included, and a bit "0" is assigned to a pixel position where a dark portion is included. In this case, the bit "1" is assigned to the pixel position (x, y) in the captured image of the measurement target object 104 onto which the pattern P1 has been projected; the bit "0" is assigned to the pixel position (x, y) in the captured image of the measurement target object 104 onto which the pattern P2 has been projected; the bit "1" is assigned to the pixel position (x, y) in the captured image of the measurement target object 104 onto which the pattern P3 has been projected, and finally the bit "0" is assigned to the pixel position (x, y) in the captured image of the measurement target object 104 onto which the pattern P4 has been projected. By aligning, in the order of the projection of the patterns P1, P2, P3 and P4, the bits for the pixel position (x, y) in the captured images of the measurement target object 104 onto which the patterns have been projected, a binary code "1010" is obtained. In a Gray code, the binary number "1010" is interpreted as a decimal number "14". Therefore, the pixel position (x, y) belongs to the 14th region of 16 regions obtained by dividing the space as described above. The 14th region is defined by the location of a pixel of the captured image where the same Gray code is formed. In this case, the 14th region corresponds to a pixel of the captured image which forms the bright portion in the pattern P1, the dark portion in the pattern P2, the bright portion in the pattern P3, and the dark portion in the pattern P4.

On the other hand, to read a combination of bright and dark portions from the captured images, projection of patterns N1 to N4 (on the right side of FIG. 3) obtained by inverting the bright and dark portions of the patterns P1 to P4, in addition to the patterns P1 to P4, is widely performed. The patterns N1 to N4 may be referred to as negative or inverted patterns.

For example, the projection unit 101 sequentially projects the patterns P1 and N1, and the image-capturing unit 102 captures the respective images. The captured image may be represented by IP1($u,v$) when the pattern P1 is projected, and the captured image when the pattern N1 is projected may be represented by IN1($u,v$) (u and v respectively representing x- and y-coordinate values in each captured image). At this time, the image-processing unit 205 assigns the bit "1" to a pixel position (u, v) which satisfies IP1($u, v$)>IN1($u, v$), and assigns the bit "0" to the pixel position (u, v) which satisfies IP1($u, v$)≤IN1($u, v$). The image processing unit 205 assigns the bits for the patterns P2 to P4 and N2 to N4 in the same manner, and thus assigns a code to each pixel position, similarly to the above method.

If, however, part or all of the measurement target object 104 is translucent, for example, the material of the measurement target object 104 is plastic or the like, an error may occur in bright/dark portion determination depending on the projection direction of the projection unit 101 and the orientation of the measurement target object 104. More specifically, when scattered light within the measurement target object 104 is added to reflection light by the surface of the measurement target object 104, the waveform of the pattern observed in the captured image is largely distorted. Since scattering occurring within the measurement target object 104 depends on the orientation of the surface of the measurement target object 104 and the direction of light entering the measurement target object 104, the projection light of only one of the positive pattern and negative pattern is considerably distorted, and the projection light of the other pattern is hardly distorted. As a result, a boundary for satisfying the above condition shifts with respect to a case in which no internal scattering occurs. Alternatively, when the system 100 or the projection unit 101 or image capturing unit 102 as a component of the system 100 generates vibrations, a similar shift may occur.

Figure 4A:
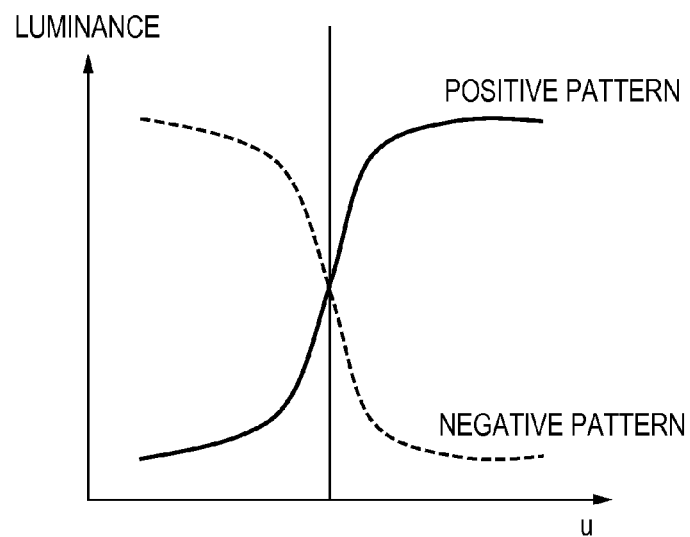
FIGS. 4A and 4B are graphs for explaining an encoding error.
Figure 4B:
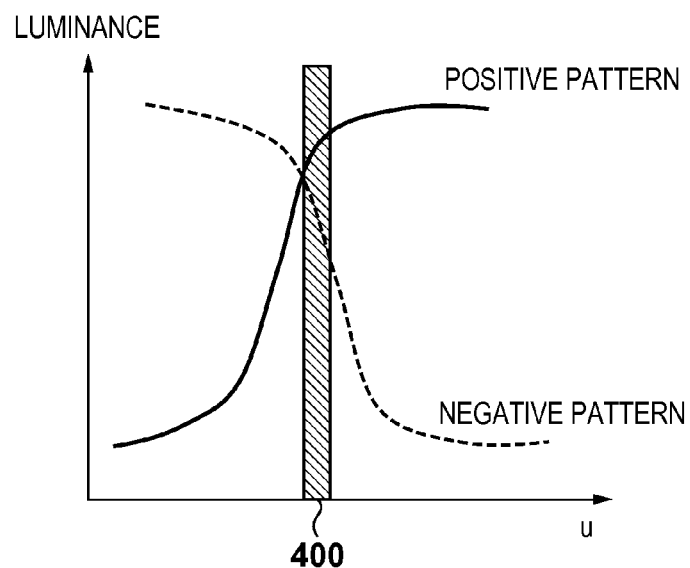

This phenomenon will be described in detail with reference to FIGS. 4A and 4B. FIG. 4A shows an example of a change in luminance on the same horizontal line (u) near the bright/dark boundary portion in captured images IP1 and IN1 when the patterns P1 and N1 are projected onto an opaque object. FIG. 4B shows an example of a change in luminance on the same horizontal line (u) near the bright/dark boundary portion in the captured images IP1 and IN1 when the patterns P1 and N1 are projected onto a translucent object. In both FIGS. 4A and 4B, a solid line represents an example of a change in luminance on the horizontal line near the bright/dark boundary portion in the captured image IP1, and a broken line represents an example of a change in luminance on the same horizontal line near the bright/dark boundary portion in the captured image IN1. At this time, a value for u which satisfies IP1($u$, $v$)=IN1($u$, $v$) represents a boundary which is indicated as a vertical solid line. Referring to FIG. 4A, with respect to the vertical solid line, the left region is determined as a dark portion (bit "0") and the right region is determined as a bright portion (bit "1").

On the other hand, referring to FIG. 4B, a waveform indicated by the solid line is largely distorted, and the position of the intersection point of the waveform of the solid line and the waveform of the broken line shifts, as compared with FIG. 4A. A hatched region 400 of FIG. 4B is a region where a dark portion (bit "0") should be originally determined but a bright portion (bit "1") is erroneously determined because of the distortion of the waveform along with internal scattering, resulting in an encoding error.

Figure 5:
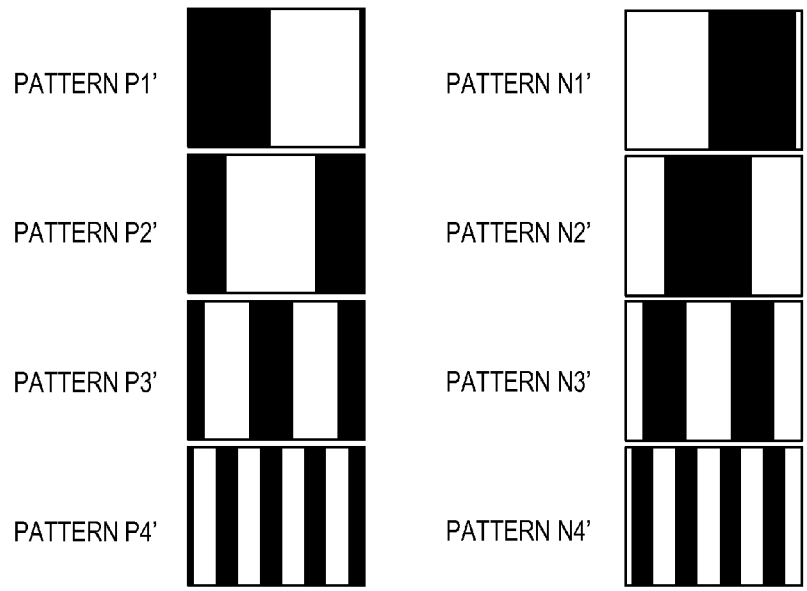
FIG. 5 illustrates examples of space-division patterns.

In this embodiment, in addition to patterns like the patterns P1 to P4 and N1 to N4, the projection-pattern generation unit 202 generates pattern images by changing the boundary positions between the bright and dark portions in the patterns. In the space-division patterns shown in FIG. 3, a position where an encoding error as described above occurs is limited to a region near the boundary between the bright and dark portions. Therefore, in this embodiment, the projection-pattern generation unit 202 further generates other space-division patterns each having no boundary between the bright and dark portions of the pattern near the position where an encoding error occurs. FIG. 5 shows examples of such space-division patterns.

Each of patterns P1' to P4' shown in FIG. 5 is obtained by changing the positions of the boundaries between the bright and dark portions in each of the patterns P1 to P4 of FIG. 3. That is, the boundary positions in each of the patterns P1 to P4 are different from those in each of the corresponding patterns P1' to P4'. More specifically, each of the patterns P1' to P4' is generated by shifting the boundary positions in each of the corresponding patterns P1 to P4 by a half of a minimum unit. For example, if the width of each of the patterns P1 to P4 is 32 pixels, each of the patterns P1' to P4' is generated by shifting the pattern of a corresponding one of the patterns P1 to P4 leftward by one pixel. The space-division patterns shown in FIG. 3 will be referred to as Gray code patterns hereinafter, and the space-division patterns shown in FIG. 5 will be referred to as shift Gray code patterns hereinafter. Note that each of the patterns P1 to P4 and each of the corresponding patterns P1' to P4' need only to be space-division patterns having different boundary positions. As long as this condition is satisfied, the patterns P1 to P4 and P1' to P4' may be any space-division patterns.

Note that with respect to the space-division patterns shown in FIGS. 3 and 5, the widths of the bright and dark portions are desirably adjusted according to the degree of actual scattering of the measurement target object 104. For example, if the width of the region 400 in FIG. 4B is large, it is possible to reduce the probability that an encoding error occurs by increasing the widths of the bright and dark portions. If the resolution of the pattern is the same, the bit depth of the pattern accordingly decreases, and a space-division count also decreases. Therefore, an appropriate value is set according to the tolerance occurrence probability of an encoding error and the number of pattern-projection operations (also known as shooting operations).

Figure 6:
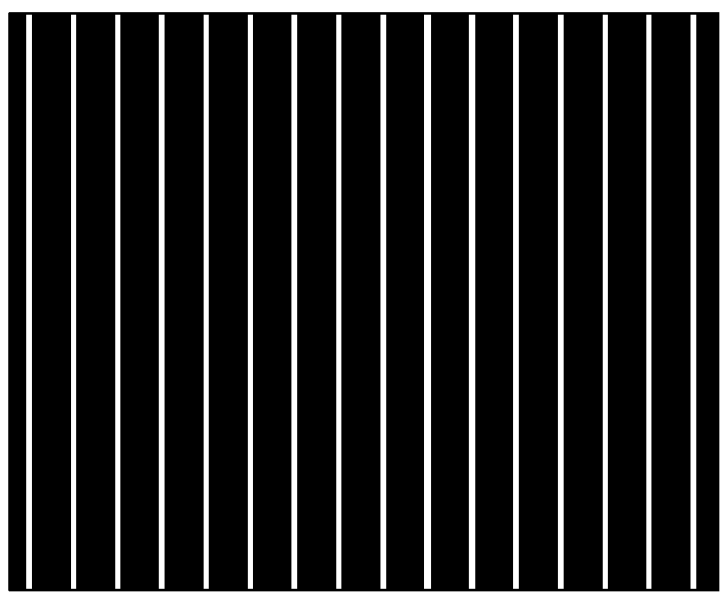
FIG. 6 illustrates an example of a coordinate-detection pattern.

In addition to the above-described space-division patterns, the projection-pattern generation unit 202 supplies the coordinate-detection pattern to the projection unit 101. FIG. 6 shows an example of the coordinate-detection pattern. The coordinate-detection pattern of FIG. 6 includes a plurality of vertical solid lines (coordinate-detection patterns), and the three-dimensional coordinates of the measurement target object 104 are precisely measured using the individual solid lines. On the other hand, in this embodiment, the solid lines are drawn at intervals of 8 pixels, and thus only one solid line is projected at once onto a region divided by the space-division pattern. Therefore, the space-division patterns shown in FIGS. 3 and 5 are projected, and combinations of bright and dark portions are decoded, thereby identifying the regions in the space and specifying the individual solid lines.

Note that the aforementioned space-division patterns and coordinate-detection pattern may be generated and stored in a memory (not shown) in advance, and read out and supplied to the projection unit 101 by the projection-pattern generation unit 202, as needed. Alternatively, the projection-pattern generation unit 202 may generate, as needed, space-division patterns and a coordinate-detection pattern, and supply them to the projection unit 101.

Upon receiving a captured image sent by the image-capturing unit 102, the image input unit 204 transfers the received captured image to the image-processing unit 205. The transfer form is not limited to this. For example, the image input unit 204 may store a captured image sent by the image-capturing unit 102 in a memory (not shown). When captured images that are to be used for one three-dimensional shape measurement operation are stored, the image input unit 204 may transfer the group of captured images stored in the memory to the image-processing unit 205.

For the captured image transferred from the image input unit 204, the image-processing unit 205 performs image processing such as the decoding of patterned light included in the captured image and the processing of normalizing projection coordinates and image coordinates. When the captured image has a distortion originating from an optical system, the image-processing unit 205 also performs processing of correcting and removing the distortion. With respect to each pixel of the captured image, the image-processing unit 205 decodes (or specifies) a corresponding region in the space where the pattern has been projected, by assigning the code to each pixel position on the captured image using the bright and dark portions of the captured image.

The processing executed by the image-processing unit 205 will be described in more detail below. Patterns P1 to Pn (where n is a natural number of 2 or more) may be used as the positive patterns of the Gray code patterns, and patterns N1 to Nn may be used as the negative patterns of the Gray code patterns. Similarly, patterns P1' to Pn' may be used as the positive patterns of the shift Gray code patterns, and patterns N1' to Nn' may be used as the negative patterns of the shift Gray code patterns.

The captured images of the measurement target object 104 onto which the respective patterns P1 to Pn have been projected (together with the coordinate-detection pattern) are represented by IP1 to IPn. The captured images of the measurement target object 104 onto which the respective patterns N1 to Nn have been projected (together with the coordinate-detection pattern) are represented by IN1 to INn. The captured images of the measurement target object 104 onto which the respective patterns P1' to Pn' have been projected (together with the coordinate-detection pattern) are represented by IP1' to IPn'. The captured images of the measurement target object 104 onto which the respective patterns N1' to Nn' have been projected (together with the coordinate-detection pattern) are represented by IN1' to INn'.

At this time, the image-processing unit 205 obtains $dp_k(u, v)$ and $dp'_k(u, v)$ for all values k satisfying $1 \leq k \leq n$ according to:

$$dp_k(u, v) = \frac{|IP_k(u, v) - IN_k(u, v)|}{IP_k(u, v) + IN_k(u, v)} \quad (1)$$

$$dp'_k(u, v) = \frac{|IP'_k(u, v) - IN'_k(u, v)|}{IP'_k(u, v) + IN'_k(u, v)}$$

where $IP_k(u, v)$ represents the luminance value of a pixel at the pixel position (u, v) in a captured image IPk (non-inverted image), and $IN_k(u, v)$ represents the luminance value of a pixel at the pixel position (u, v) in a captured image INk (inverted image). Furthermore, $dp_k(u, v)$ represents the luminance difference between $IP_k(u, v)$ and $IN_k(u, v)$ in consideration of the brightness of each captured image.

In addition, $IP_k'(u, v)$ represents the luminance value of a pixel at the pixel position (u, v) in a captured image IPk', and $IN_k'(u, v)$ represents the luminance value of a pixel at the pixel position (u, v) in a captured image INk'. Furthermore, $dp_k'(u, v)$ represents the luminance difference between $IP_k'(u, v)$ and $IN_k'(u, v)$ in consideration of the brightness of each captured image.

The image processing unit 205 obtains dp(u, v) representing a smallest value of $dp1(u, v)$ to $dpn(u, v)$ and dp'(u, v) representing a smallest value of $dp1'(u, v)$ to $dpn'(u, v)$ according to:

$$dp(u, v) = \min_k (dp_k(u, v)) \quad (2)$$

$$dp'(u, v) = \min_k (dp'_k(u, v))$$

When dp or dp' is smaller, the pixel position (u, v) in the captured image is closer to the boundary position between the bright and dark portions. The image processing unit 205 compares the magnitudes of dp(u, v) and dp'(u, v). If dp(u, v)>dp'(u, v), the captured images of the measurement target object 104 onto which the Gray code patterns have been projected, that is, the captured images IP1 to IPn and IN1 to INn are selected as captured images (also referred to as selection images) to be used to decide a code for the pixel position (u, v). On the other hand, if dp(u, v)≤dp'(u, v), the captured images of the measurement target object 104 onto which the shift Gray code patterns have been projected are selected as captured images (selection images) to be used to decide a code for the pixel position (u, v). That is, the captured images IP1' to IPn' and IN1' to INn' are selected.

In either case, bright/dark determination is performed for each pixel position of the captured images using the n captured images obtained by projecting the positive patterns and the n captured images obtained by projecting the negative patterns, thereby assigning a code to the pixel position. With this processing, it is possible to obtain a bit string (i.e. a code) of n bits for each pixel position.

As described above, the space where the projection unit 101 projects the space-division patterns is divided into 8-pixel regions. Consequently, the position of a region on the pattern corresponding to a pixel position for which a code has been obtained using the captured images IP1 to IPn and IN1 to INn can be obtained by multiplying a decimal value representing the code by 8. For example, if the decimal value representing the code is 14, the code corresponds to the 14th region of 16 regions obtained by dividing the pattern in the horizontal direction. Since the position of the 14th region (the boundary position between the 13th and 14th regions) is 14×8=112, the position of the region on the pattern corresponding to the pixel position for which the code has been obtained is 112.

On the other hand, as described above, each shift Gray code pattern of this embodiment shifts by 1/32 with respect to the corresponding Gray code pattern, and thus shifts by 4 pixels (128÷32=4) with respect to the horizontal resolution "128" of the projection unit 101. Consequently, the position of the region on the pattern corresponding to the pixel position for which the code has been obtained using the captured images IP1' to IPn' and IN1' to INn' can be obtained by subtracting 4 from a value obtained by multiplying a decimal value representing the code by 8.

Since the constants of the multiplication and subtraction operations are different depending on the resolution of the projection unit 101, the number of projection patterns (also referred to as the region division count), the arrangements of the shift Gray code patterns, and the like, it is necessary to set appropriate values according to the embodiment.

The above processing makes it possible to specify the position of a specific region on the pattern, which corresponds to a code assigned to each pixel position on the captured image. The image processing unit 205 specifies a coordinate-detection pattern, which corresponds to each coordinate-detection pattern in the captured image, thereby obtaining the correspondence between the coordinate-detection pattern in the captured image and that in the original coordinate-detection pattern.

The image-processing unit 205 calculates the image coordinates of each coordinate-detection pattern projected onto the measurement target object 104 from the captured images (to be referred to as captured images used to obtain a code) at high accuracy. As a method of calculating the image coordinates, there are known various methods such as a method of estimating the projection center of the projected coordinate-detection pattern (line) from the largest luminance value of the line. If the measurement target object 104 is a translucent object, a waveform obtained by projecting the line pattern is distorted for the above-described reasons. It is possible to estimate accurately the coordinates of the center of the line by applying the method disclosed in patent literature 2.

The image processing unit 205 obtains a position (x+y) by adding a value y represented by the lower three bits of the position of each coordinate-detection pattern to a position x on a pattern corresponding to a code corresponding to the image coordinates of a coordinate-detection pattern Z obtained from the captured images. The image processing unit 205 specifies a coordinate-detection pattern Z' at the position (x+y) in the coordinate-detection pattern, which corresponds to the coordinate-detection pattern Z. In this way, it is possible to specify a coordinate-detection pattern in the original coordinate-detection pattern, which corresponds to one of coordinate-detection pattern included in the captured image. This makes it possible to obtain the correspondence between the coordinate-detection pattern in the captured image and that in the original coordinate-detection pattern. In this embodiment, since the coordinate-detection pattern is projected at a width of 8 pixels, the value y is common to all the solid lines (the value y is defined for each coordinate-detection pattern).

The image-processing unit 205 sends, to a three-dimensional-coordinate calculation unit 208, the correspondence between the position (image coordinates) of each coordinate-detection pattern in the captured image and the position (projection coordinates) of the coordinate-detection pattern in the original coordinate-detection pattern, which corresponds to the coordinate-detection pattern in the captured image.

A parameter storage unit 206 stores control parameters to be used by the control unit 210 to control the image-capturing unit 102 and the projection unit 101, parameters to be used by the three-dimensional coordinate calculation unit 208 to execute three-dimensional-coordinate calculation processing, and the like. Therefore, the control unit 210 and the three-dimensional-coordinate calculation unit 208 read out and use the parameters stored in the parameter storage unit 206, as needed.

The three-dimensional-coordinate calculation unit 208 acquires the correspondence between the image coordinates and the projection coordinates, which has been sent from the image processing unit 205, and calibration data of the projection unit 101 and image capturing unit 102 stored in the parameter storage unit 206. The three-dimensional-coordinate calculation unit 208 measures the three-dimensional shape of the measurement target object 104 by a well-known method using the acquired pieces of information, and sends a measurement result to a result output unit 209.

The result output unit 209 outputs the measurement result of the three-dimensional-coordinate calculation unit 208. The output form is not limited to any specific output form. The measurement result may be displayed on a display unit (not shown), or output to a memory or apparatus provided within or outside the apparatus. Alternatively, the measurement result may be output to a device such as a robot for operating the measurement target object 104.

Figure 7:
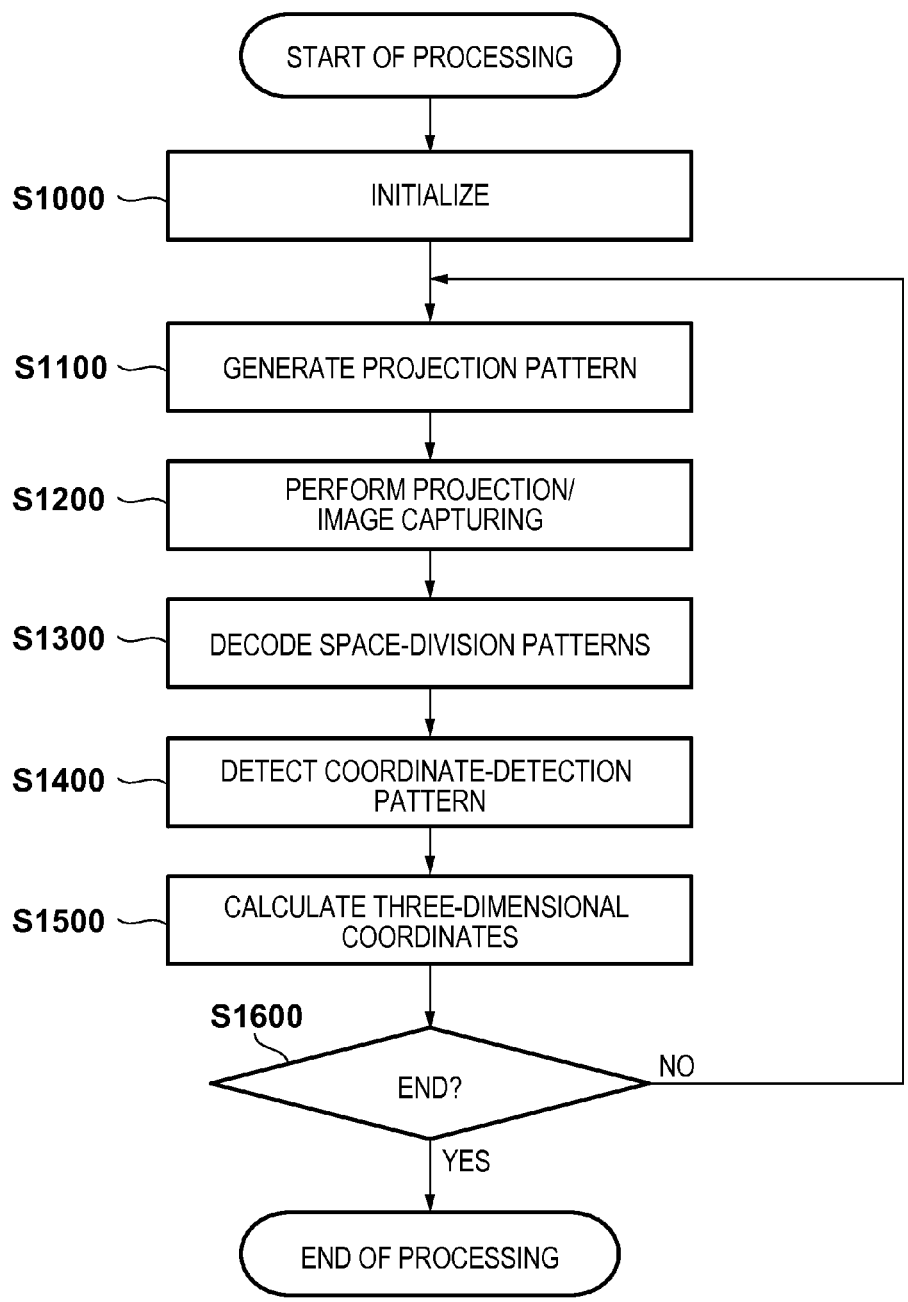
FIG. 7 is a flowchart illustrating processing executed by a control apparatus 103.

The above-described three-dimensional shape measurement processing of the measurement target object 104 by the control apparatus 103 will be explained with reference to FIG. 7 which shows a flowchart illustrating the processing. Note that contents of processing in each step shown in FIG. 7 are as described above, and the processing in each step will be briefly explained below.

When the control apparatus 103 is activated, for example, the control apparatus 103 is powered on, the control unit 210 performs various kinds of initialization processing of the system 100 in step S1000. In the initialization processing, the projection unit 101 and the image capturing unit 102 are activated, and various parameters such as calibration data of the projection unit 101 and of the image-capturing unit 102 are stored in the parameter storage unit 206.

In step S1100, the projection pattern generation unit 202 generates a space-division pattern and a coordinate-detection pattern, and sends the space-division pattern to the projection unit 101 together with the coordinate-detection pattern.

In step S1200, the projection unit 101 projects the space-division pattern and the coordinate-detection pattern, the image-capturing unit 102 performs the image capture, and thus the image input unit 204 acquires a captured image obtained every time the image-capturing unit 102 performs image capture.

In step S1300, the image-processing unit 205 generates a code for each pixel position using the respective captured images obtained by the image capturing unit 102. In step S1400, the image-processing unit 205 obtains the position of a coordinate-detection pattern from the respective captured images, and obtains the correspondence between image coordinates and projection coordinates by the aforementioned processing.

In step S1500, the three-dimensional-coordinate calculation unit 208 measures the three-dimensional shape of the measurement target object 104 by a well-known method using the correspondence between the image coordinates and the projection coordinates obtained in step S1400 and the calibration data stored in the parameter storage unit 206. The three-dimensional-coordinate calculation unit 208 sends a measurement result to the result output unit 209, and the result output unit 209 outputs the measurement result of the three-dimensional-coordinate calculation unit 208.

In step S1600, the control unit 210 determines whether the end condition of the process has been satisfied, for example, whether an end instruction of the process has been input. If it is determined that the end condition has been satisfied, the process ends; otherwise, the process returns to step S1100 to perform the subsequent processing.

Note that each processing step of steps S1200 to S1500 shown in FIG. 7 need not always be executed in the order shown in FIG. 7. Processing steps having no interdependence may be executed in parallel, and the order of the processing steps may be changed, as needed.

In step S1200, it is not always necessary to project all the patterns and perform image capturing in advance. When an image necessary for next processing is obtained, projection and image capturing in step S1200 may be interrupted to advance to the next processing. It can be configured to resume projection of the remaining patterns and image capturing upon completion of the processing.

As described above, according to this embodiment, a space-division pattern which suppresses an encoding error is further projected, and a measurement space including a measurement target object is divided into a predetermined number of regions. The projection unit can project a coordinate-detection pattern unique for each divided region, thereby precisely calculating the three-dimensional coordinates of the measurement target object surface. This embodiment has a large effect especially when a measurement target object includes a translucent portion which causes internal scattering.

In summary, in this embodiment, the first captured image is acquired of a space onto which the first pattern formed from bright and dark portions and the coordinate-detection pattern projected onto each region of the space divided by projecting the first pattern have been projected. Furthermore, the second captured image is acquired of the space onto which the second pattern formed from bright and dark portions and having a boundary position between the bright and dark portions that is different from that of the first pattern, and the coordinate-detection pattern projected onto each region of the space divided by projecting the second pattern have been projected. One of the first and second captured images is selected as a selection image using luminance values in the first and second captured images. The three-dimensional shape measurement of the object included in the space is performed using the correspondence between a coordinate-detection pattern in the selection image and the projected coordinate-detection pattern for the selection image.

Second Embodiment

In this embodiment, at the time of projecting a space-division pattern, the boundary portion between the bright and dark portions is masked so as not to project the space-division pattern. This further reduces the probability of an encoding error at the time of space-division, thereby making it possible to calculate the three-dimensional coordinates of a measurement target object surface more stably.

The difference from the first embodiment will be mainly described below, and a description of the same points as in the first embodiment will be omitted. That is, details are the same as in the first embodiment unless specifically stated otherwise.

Figure 8A:
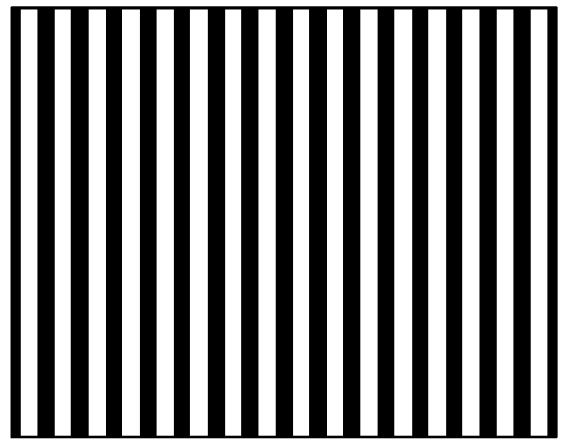
FIGS. 8A and 8B each show an example of a mask pattern.
Figure 8B:
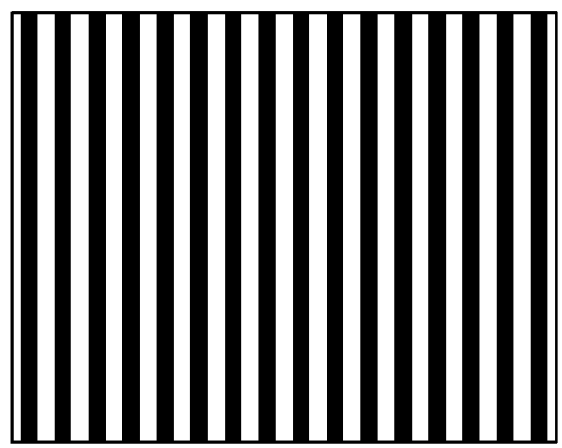

FIGS. 8A and 8B each show an example of a mask pattern used to mask a pattern to be projected by a projection unit 101. FIG. 8A shows an example of a mask pattern used to mask a Gray code pattern. FIG. 8B shows an example of a mask pattern used to mask a shift Gray code pattern.

When the mask pattern is used to mask and project a Gray code pattern (shift gray code pattern), patterned light is projected for white portions of the mask pattern, and is blocked for black portions of the mask pattern. That is, the projection unit 101 masks a Gray code pattern (shift Gray code pattern) supplied from a projection-pattern-generation unit 202 using the mask pattern, and then projects the pattern.

Each of these mask patterns is set so that the projection unit 101 projects no patterned light only near the bright/dark boundary of the corresponding Gray code pattern or shift Gray code pattern. That is, in this embodiment, the accuracy of decoding is improved by projecting, by the projection unit 101, no pattern near the boundary between the bright and dark portions of the pattern which causes an encoding error when the material of a measurement target object 104 is translucent.

Figure 9:
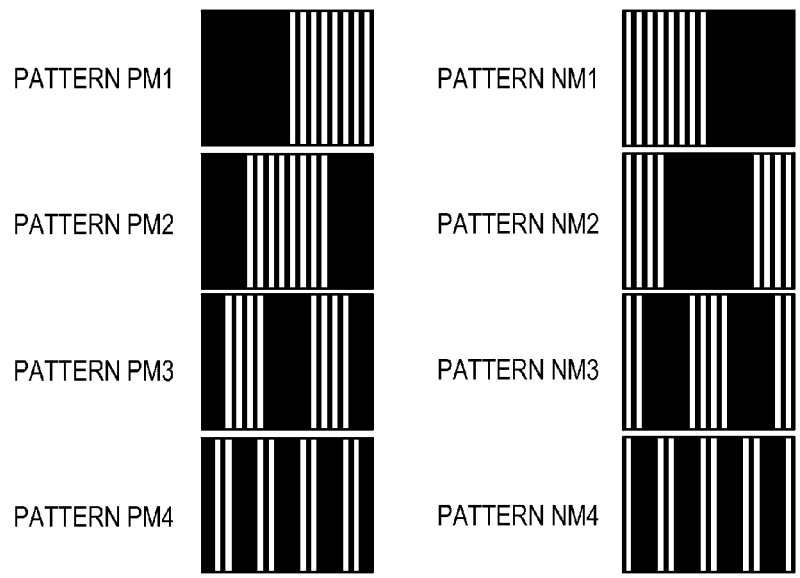
FIG. 9 shows a mask result.
Figure 10:
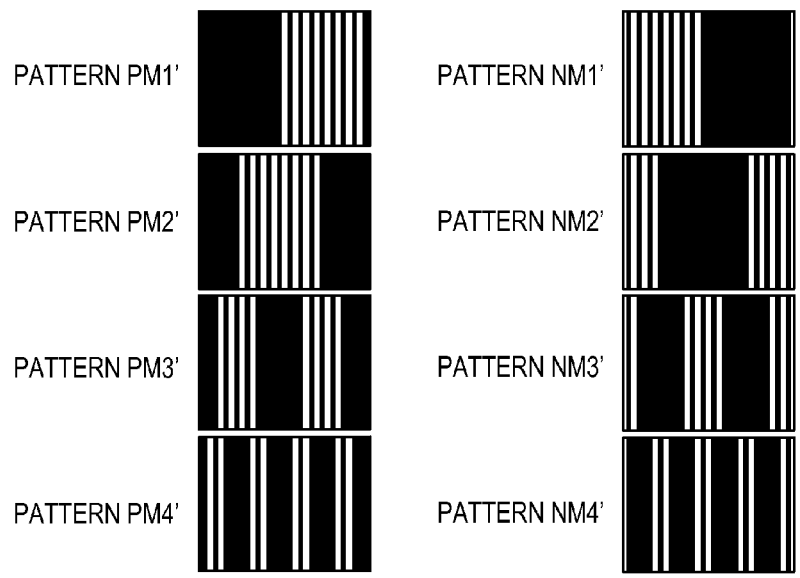
FIG. 10 shows a mask result.

FIG. 9 shows the results of masking Gray code patterns shown in FIG. 3 using the mask pattern shown in FIG. 8A. FIG. 10 shows the results of masking shift Gray code patterns shown in FIG. 5 using the mask pattern shown in FIG. 8B.

Referring to FIG. 9, reference symbols PM1 to PM4 denote results of masking patterns P1 to P4 of FIG. 3 using the mask pattern of FIG. 8A, respectively; and NM1 to NM4, results of masking patterns N1 to N4 of FIG. 3 using the mask pattern of FIG. 8A, respectively.

Referring to FIG. 10, reference symbols PM1' to PM4' denote results of masking patterns P1' to P4' of FIG. 5 using the mask pattern of FIG. 8, respectively; and NM1' to NM4', results of masking patterns N1' to N4' using the mask pattern of FIG. 8B, respectively.

Note that in this embodiment, as described above, the projection unit 101 masks the Gray code pattern (shift Gray code pattern) supplied from the projection pattern generation unit 202 using the mask pattern, and then projects the pattern. However, the projection pattern generation unit 202 may supply, to the projection unit 101, the results of masking the Gray code patterns (shift Gray code patterns) using the mask pattern.

In this embodiment, a process of deciding whether to use captured images obtained by projecting the Gray code patterns or captured images obtained by projecting the shift Gray code patterns for deciding a code for each pixel position is different from that in the first embodiment.

Assume that patterns PM1 to PMn (for example, PM1 to PM4 of FIG. 9) are used as the positive patterns of the Gray code patterns, and patterns NM1 to NMn (for example, NM1 to NM4 of FIG. 9) are used as the negative patterns of the Gray code patterns. Assume also that patterns PM1' to PMn' (for example, PM1' to PM4' of FIG. 10) are used as the positive patterns of the shift Gray code patterns, and patterns NM1' to NMn' (for example, NM1' to NM4' of FIG. 10) are used as the negative patterns of the shift Gray code patterns.

The captured images of the measurement target object 104 onto which the respective patterns PM1 to PMn have been projected (together with the coordinate-detection pattern) are represented by IPM1 to IPMn. The captured images of the measurement target object 104 onto which the respective patterns NM1 to NMn have been projected (together with the coordinate-detection pattern) are represented by INM1 to INMn. The captured images of the measurement target object 104 onto which the respective patterns PM1' to PMn' have been projected (together with the coordinate-detection pattern) are represented by IPM1' to IPMn'. The captured images of the measurement target object 104 onto which the respective patterns NM1' to NMn' have been projected (together with the coordinate-detection pattern) are represented by INM1' to INMn'.

In this case, an image processing unit 205 obtains $dpm_k(u, v)$ and $dpm'_k(u, v)$ for all values k satisfying $1 \le k \le n$ according to:

$$dpm_k(u,v) = |IPM_k(u,v) - INM_k(u,v)|$$

$$dpm'_k(u,v) = |IPM'_k(u,v) - INM'_k(u,v)| \quad (3)$$

where $IPM_k(u, v)$ represents the luminance value of a pixel at a pixel position (u, v) in a captured image $IPM_k$, and $INM_k(u, v)$ represents the luminance value of a pixel at the pixel position (u, v) in a captured image $INM_k$. Furthermore, $dpm_k(u, v)$ represents the luminance difference between $IPM_k(u, v)$ and $INM_k(u, v)$.

Furthermore, $IPM_k'(u, v)$ represents the luminance value of a pixel at the pixel position (u, v) in a captured image $IPM_k'$, and $INM_k'(u, v)$ represents the luminance value of a pixel at the pixel position (u, v) in a captured image $INM_k'$. Furthermore, $dpmk'(u, v)$ represents the luminance difference between $IPM_k'(u, v)$ and $INM_k'(u, v)$.

In this embodiment, a region near the boundary between the bright and dark portions of the pattern is masked to prevent patterned light from being projected by the projection unit 101, and thus one of the values $dpm_k$ and $dpm'_k$ is small for all the values k. That is, for all the values k, $dpm_k(u, v) > dpm'_k(u, v)$ or $dpm_k(u, v) < dpm'_k(u, v)$ always holds.

Therefore, for a given k, it is determined whether $dpm_k(u, v) > dpm'_k(u, v)$ or $dpm_k(u, v) < dpm'_k(u, v)$ holds. If $dpm_k(u, v) > dpm'_k(u, v)$, the captured images of the measurement target object 104 onto which the Gray code patterns have been projected, that is, the captured images IPM1 to IPMn and INM1 to INMn are selected as captured images to be used to decide a code for the pixel position (u, v). On the other hand, if $dpm_k(u, v) \le dpm'_k(u, v)$, the captured images of the measurement target object 104 onto which the shift Gray code patterns have been projected are selected as captured images to be used to decide a code for the pixel position (u, v). That is, the captured images IPM1' to IPMn' and INM1' to INMn' are selected.

As described above, in this embodiment, it is possible to select the Gray code patterns or shift Gray code patterns more reliably than in the first embodiment. By applying the mask pattern, all the space-division patterns are modulated at a high frequency. Consequently, as described in non-patent literature 1, it is possible to obtain the effect of suppressing the influence of internal scattering. That is, when the measurement target object 104 includes a translucent portion, it is possible to reduce the occurrence probability of an encoding error at the time of identifying a region, thereby implementing stable three-dimensional measurement.

As described above, according to this embodiment, for a space-division pattern to be projected, a mask pattern is set and controlled not to project the bright/dark boundary portion of the pattern. This further reduces the probability of an encoding error at the time of space-division, thereby making it possible to more stably calculate the three-dimensional coordinates of a measurement target object surface.

Third Embodiment

Figure 11:
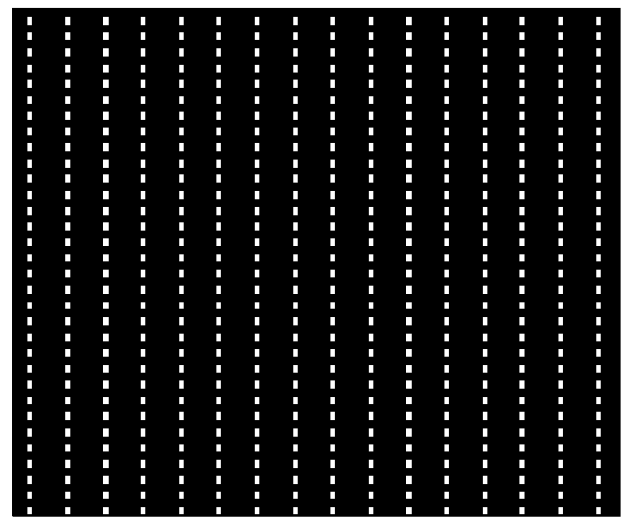
FIG. 11 shows an example of a coordinate-detection pattern.

In the first embodiment, the coordinate-detection pattern formed from a plurality of line segments is used, as shown in FIG. 6. In this embodiment, as shown in FIG. 11, a coordinate-detection pattern formed from a plurality of broken lines is used. By projecting such coordinate-detection pattern onto a measurement target object 104, the influence of internal scattering occurring in the measurement target object 104 is removed, resulting in more accurate calculation of three-dimensional coordinates on the surface of the measurement target object 104.

The difference from the first embodiment will be mainly described below, and a description of the same points as in the first embodiment will be omitted. That is, details are the same as in the first embodiment unless specifically stated otherwise.

In this embodiment, a projection pattern generation unit 202 supplies, to a projection unit 101, the coordinate-detection pattern formed from the plurality of broken lines shown in FIG. 11, instead of the coordinate-detection pattern formed from the plurality of line segments shown in FIG. 6. The projection unit 101 projects, onto a space including the measurement target object 104, the coordinate-detection pattern formed from the plurality of broken lines, which has been supplied from the projection pattern generation unit 202. As described in non-patent literature 2, in this embodiment, the broken line pattern is projected onto the measurement target object 104, and the influence of internal scattering of the measurement target object 104 is removed, thereby making it possible to calculate more precisely the projection coordinates.

Figure 12:
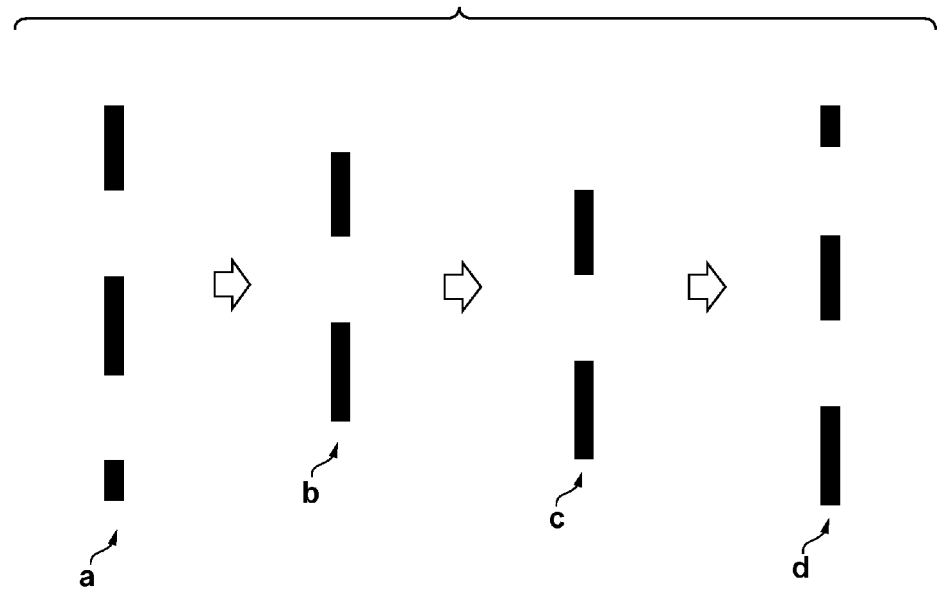
FIG. 12 illustrates the processing used to generate a plurality of coordinate-detection patterns.

The projection-pattern-generation unit 202 generates, for the broken line pattern shown in FIG. 11, a plurality of patterns by sequentially shifting the broken lines in a longitudinal direction (the vertical direction in the coordinate-detection pattern), and sends the generated patterns to the projection unit 101. FIG. 12 is a view for explaining processing of generating a plurality of coordinate-detection patterns by extracting only some of the broken lines forming the coordinate-detection patterns.

The projection pattern generation unit 202 generates a pattern by shifting the broken lines in the vertical direction by one pixel. In FIG. 12, a indicates a broken line of a repetition pattern in which two pixels in the longitudinal direction of the broken line form a bright portion and two pixels of the broken line form a dark portion with respect to the pixels of the projection unit 101. The projection pattern generation unit 202 newly generates a pattern (b of FIG. 12) by shifting the broken lines shown in a of FIG. 12 downward by one pixel, and sends the generated pattern to the projection unit 101. The projection unit 101 projects the pattern toward the space including the measurement target object 104. Every time a pattern is projected, the image-capturing unit 102 captures the space including the measurement target object 104.

Next, the projection-pattern-generation unit 202 generates a pattern (c of FIG. 12) by further shifting the broken lines downward by one pixel, and sends the generated pattern to the projection unit 101. The projection pattern generation unit 202 generates coordinate-detection patterns by repeating the shift processing for one cycle of the broken line. In this example, the projection pattern generation unit 202 generates four patterns (a to d of FIG. 12) by shifting the broken lines in the longitudinal direction, and sends the generated patterns to the projection unit 101.

An image processing unit 205 accurately calculates, from captured images obtained by projecting coordinate-detection patterns, image coordinates where the coordinate-detection patterns are observed on the measurement target object 104. In this embodiment, the image capturing unit 102 acquires captured images (four) obtained by projecting the four kinds of coordinate-detection patterns generated by shifting the broken line pattern, and calculates image coordinates from the four captured images.

For each pixel position (u, v), the image processing unit 205 specifies a largest value T and a smallest value S of luminance values at the pixel position of the respective four captured images. With respect to a point to be measured on the measurement target object 104, patterned light is not directly projected onto a pixel corresponding to a dark portion at the time of projecting the broken line pattern, and thus only internal scattering is observed. On the other hand, the patterned light is directly projected onto a point corresponding to a bright portion, and thus both reflection light and internal scattering are observed. Under the condition that the frequency of the broken lines is sufficiently high, the smallest value S represents an internal scattering component itself, and a value obtained by subtracting the smallest value S from the largest value T represents a reflection light component reflected by the surface of the measurement target object 104. The image processing unit 205 calculates a reflection light component from the plurality of captured images obtained by projecting the coordinate-detection patterns. That is, for each pixel position, the result of subtracting the smallest value S from the largest value T obtained for the pixel position is obtained as a luminance value (reflection light component) for the pixel position. The position of the coordinate-detection pattern is detected from the image (the captured image of the reflected light component) in which the pixel at each pixel position has the obtained reflection component. Since the influence of internal scattering has already been removed from the reflected light component, it is possible to acquire high-accuracy image coordinates by using the captured image of the reflected light component intact, instead of the captured images obtained by projecting the coordinate-detection patterns in the first embodiment.

Figure 13:
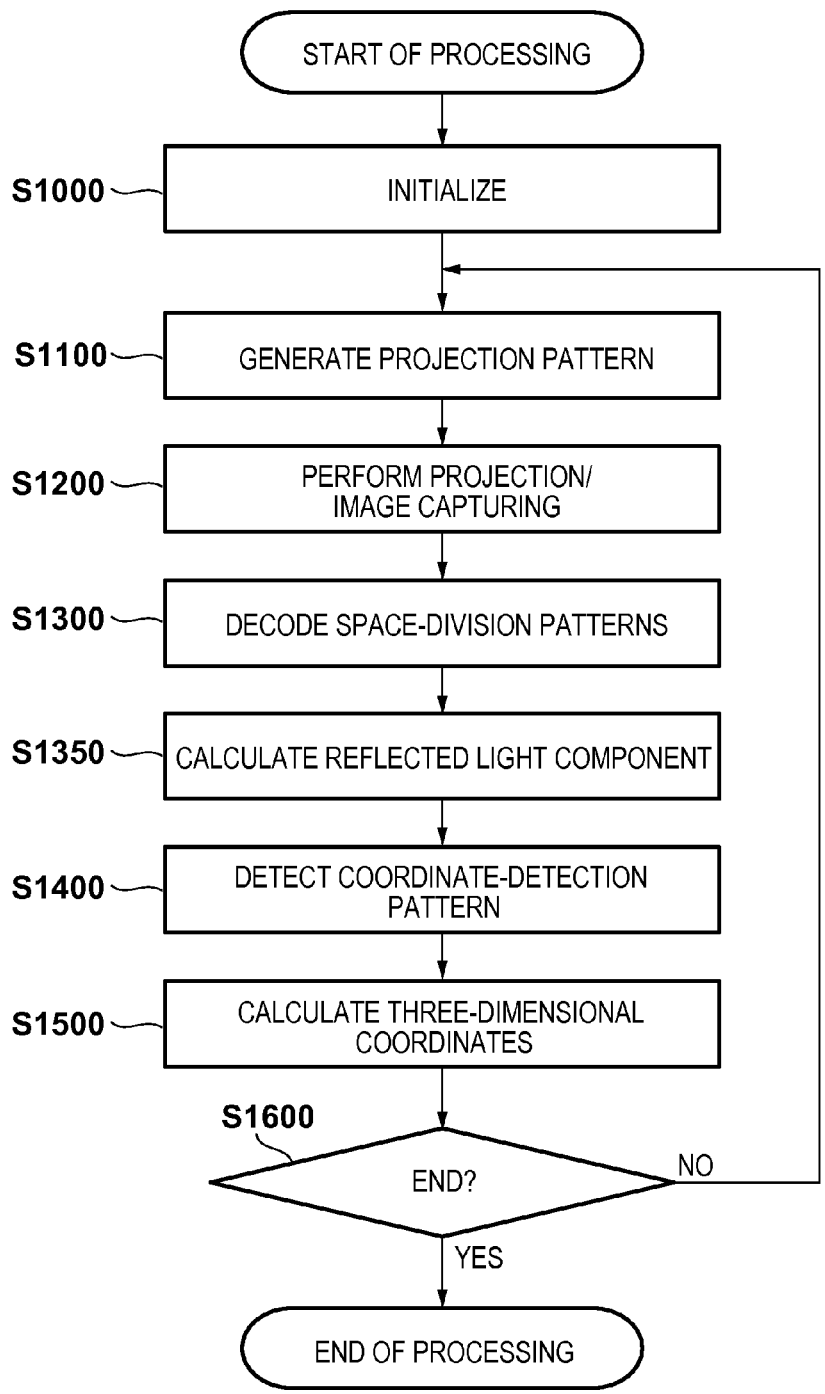
FIG. 13 is a flowchart illustrating processing executed by a control apparatus 103.

The above-described processing of performing three-dimensional shape measurement of the measurement target object 104 by a control apparatus 103 will be described with reference to FIG. 13 which shows a flowchart illustrating the process. The flowchart shown in FIG. 13 is obtained by adding step S1350 to the flowchart of FIG. 7.

In step S1350, the image processing unit 205 generates a captured image of a reflection light component by calculating the reflected light component, as described above. Therefore, in step S1400, the image-processing unit 205 obtains the position of the coordinate-detection pattern from the captured image of the reflection light component, thereby obtaining the correspondence between image coordinates and projection coordinates.

As described above, according to this embodiment, the broken line patterns are projected as coordinate-detection patterns to remove the influence of internal scattering occurring in the measurement target object, thereby making it possible to calculate three-dimensional coordinates on the surface of the measurement target object more accurately. Note that some or all of the above-described embodiments may be used in combination, as needed.

In any of the embodiments, it is possible to suppress the influence of scattering and the like when illuminating a measurement target object including a translucent portion with patterned light, and stably perform three-dimensional measurement at high accuracy.

Fourth Embodiment

Figure 2:
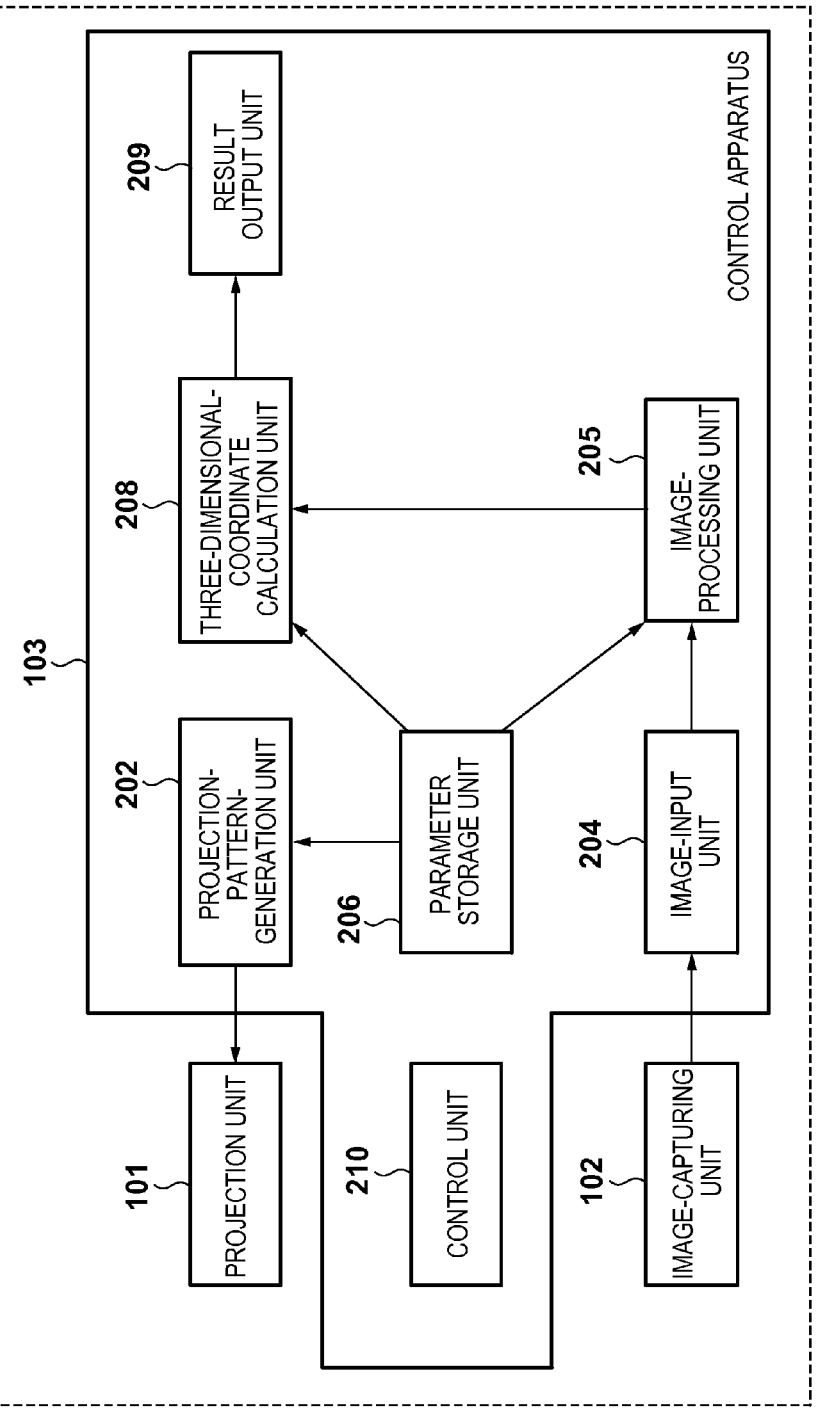
FIG. 2 is a block diagram showing an example of the functional arrangement of the system.
Figure 14:
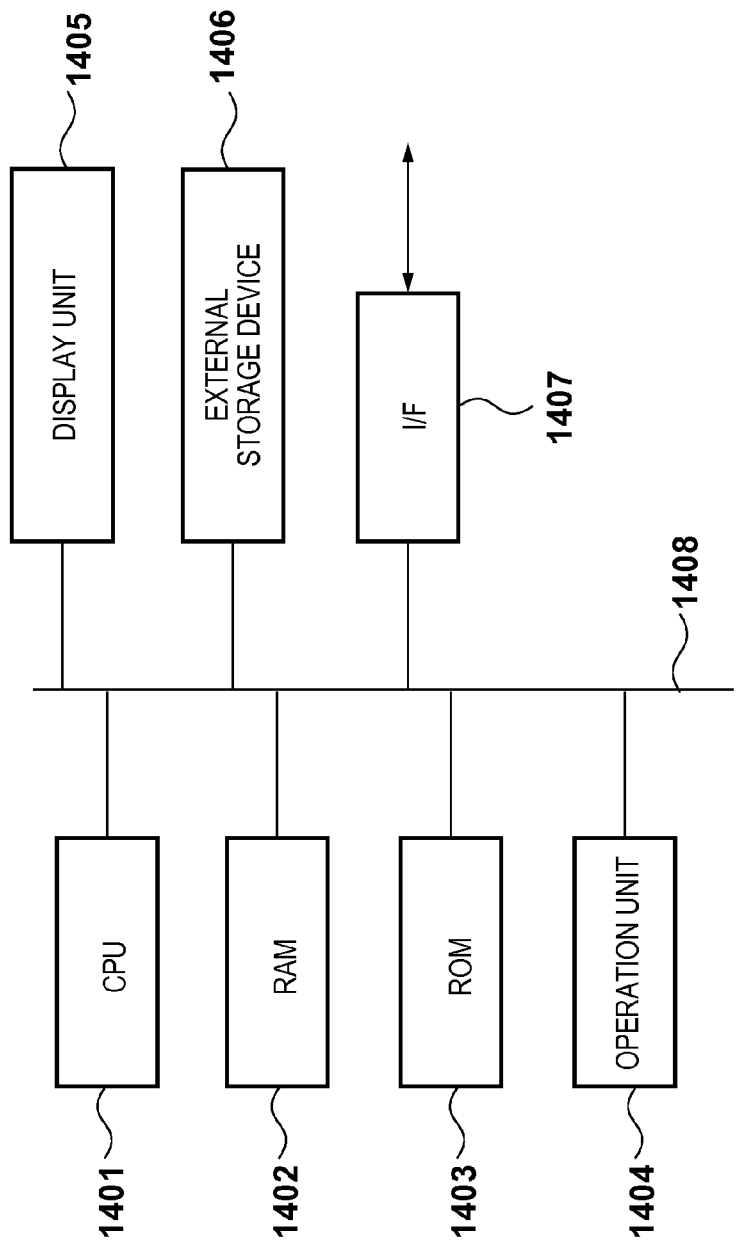
FIG. 14 is a block diagram showing an example of the hardware arrangement of a computer apparatus.

Each unit of the control apparatus 103 shown in FIG. 2 may be implemented by hardware. However, the image input unit 204, projection-pattern-generation unit 202, three-dimensional-coordinate calculation unit 208, image-processing unit 205, result output unit 209, and the like may be implemented by software (computer programs). In this case, an apparatus that has the functions of the control unit 210 and parameter storage unit 206 and can execute the computer programs is applicable to the control apparatus 103. FIG. 14 shows an example of the hardware arrangement of a computer apparatus applicable to the control apparatus 103.

A CPU 1401 controls the overall operation of the computer apparatus by executing various processes using computer programs and data stored in a RAM 1402 and a ROM 1403, and also executes each process described to be executed by the control apparatus 103. Thus, the CPU 1401 also functions as the control unit 210.

The RAM 1402 has an area for temporarily storing computer programs and data loaded from an external storage device 1406, and computer programs and data externally received via an I/F (interface) 1407. The RAM 1402 also has a work area used by the CPU 1401 to execute various processes. That is, the RAM 1402 can provide various areas, as needed. The ROM 1403 stores a boot program and setting data of the computer apparatus.

An operation unit 1404 is formed from a mouse, a keyboard, and the like, and can be operated by the user of the computer apparatus to input various instructions to the CPU 1401. For example, it is possible to input a processing end instruction, an activation instruction of the computer apparatus, and the like by operating this operation unit 1404.

A display unit 1405 is formed from a CRT, a liquid crystal screen, or the like, and can display the processing result of the CPU 1401 by images, characters, and the like. For example, the display unit 1405 can be used as the output destination of the result output unit 209.

The external storage device 1406 is a mass information storage device such as a hard disk drive device. The external storage device 1406 saves data and computer programs for causing the CPU 1401 to execute an OS (Operating system) and the respective processes described to be executed by the control apparatus 103. The computer programs include computer programs for causing the CPU 1401 to execute the respective processes described to be executed by the image input unit 204, projection pattern generation unit 202, image processing unit 205, three-dimensional coordinate calculation unit 208, and result output unit 209. The data include the information described to be saved in the parameter storage unit 206, and the various kinds of information described as known information. That is, the external storage device 1406 also functions as the parameter storage unit 206.

The computer programs and data saved in the external storage device 1406 are loaded to the RAM 1402, as needed, under the control of the CPU 1401, and are to be processed by the CPU 1401.

The I/F 1407 is used to connect an external device to the computer apparatus, and can connect the image capturing unit 102 and the projection unit 101. All the above-described respective units are connected to a bus 1408.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-007271, filed Jan. 17, 2014 which is hereby incorporated by reference herein in its entirety.

What is claimed is:

1. A three-dimensional-shape measurement apparatus comprising:
   one or more processors; and
   one or more memories coupled to the one or more processors and having instructions stored thereon which, when executed by the one or more processors, cause the three-dimensional-shape measurement apparatus to:
   acquire first captured images of a space onto which a first pattern formed from a bright portion and a dark portion has been projected;
   acquire second captured images of the space onto which has been projected a second pattern formed from a bright portion and a dark portion and having a boundary position between the bright portion and the dark portion that is different from a boundary position between the bright portion and the dark portion of the first pattern;
   select, for each of at least one predetermined region of the first captured images or the second captured images, based on a luminance value in the first captured images and a luminance value in the second captured images, one of the first captured images and the second captured images containing the at least one predetermined region as a selection image to be used for three-dimensional-shape measurement; and
   perform three-dimensional-shape measurement of an object included in the space based on the selection image,
   wherein the first captured images include a first non-inverted image as a captured image of the space onto which the first pattern has been projected and a first inverted image as a captured image of the space onto which a first reversed pattern obtained by inverting the bright portion and the dark portion of the first pattern has been projected, and
   wherein the second captured images include a second non-inverted image as a captured image of the space onto which the second pattern has been projected and a second inverted image as a captured image of the space onto which a second reversed pattern obtained by inverting the bright portion and the dark portion of the second pattern has been projected.

2. The apparatus according to claim 1, wherein the instructions, when executed by the one or more processors, further cause the three-dimensional-shape measurement apparatus to perform three-dimensional-shape measurement of the object using a pixel value located in the predetermined region in the selection image.

3. The apparatus according to claim 1, wherein the instructions, when executed by the one or more processors, further cause the three-dimensional-shape measurement apparatus to:
   for each predetermined region, acquire, as a first difference, a difference between a luminance value in the predetermined region within the first non-inverted image and a luminance value in the predetermined region within the first inverted image, and acquire, as a second difference, a difference between a luminance value in the predetermined region within the second non-inverted image and a luminance value in the predetermined region within the second inverted image, and
   select one of the first captured images and the second captured images as the selection image based on the first difference and the second difference.

4. The apparatus according to claim 3, wherein the instructions, when executed by the one or more processors, further cause the three-dimensional-shape measurement apparatus to select one of the first captured images as the selection image for the predetermined region where the first difference is larger than the second difference, and to select one of the second captured images as the selection image for the predetermined region where the first difference is smaller than the second difference.

5. The apparatus according to claim 1, wherein the first captured images include an image of the space where a coordinate-detection pattern is projected onto each region of the space divided by projecting the first pattern, and
   wherein the second captured images include an image of the space where the coordinate-detection pattern is projected onto each region of the space divided by projecting the second pattern.

6. The apparatus according to claim 5, wherein the instructions, when executed by the one or more processors, further cause the three-dimensional-shape measurement apparatus to specify, among the respective regions of the space divided by projecting the first or the second pattern in the selection image, a region onto which the coordinate-detection pattern in the selection image has been projected, and to perform the three-dimensional-shape measurement using a correspondence between the coordinate-detection pattern in the selection image and the coordinate-detection pattern projected onto the specified region among coordinate-detection patterns projected for the selection image.

7. The apparatus according to claim 5, wherein the coordinate-detection patterns are broken-line patterns in which luminance values are discontinuous.

8. The apparatus according to claim 5, wherein the coordinate-detection patterns are a plurality of patterns generated by sequentially shifting broken lines in a longitudinal direction with respect to the broken lines.

9. The apparatus according to claim 1, wherein the first pattern and the second pattern are patterns in which a boundary portion between a bright portion and a dark portion is masked.

10. The apparatus according to claim 1, wherein the instructions, when executed by the one or more processors, further cause the three-dimensional-shape measurement apparatus to:
    generate an image of a reflected light component by removing from the selection image an influence of subsurface scattering occurring in the object, and
    perform the three-dimensional-shape measurement using the image of the reflected light component as the selection image.

11. The apparatus according to claim 1, wherein the first pattern and the second pattern are patterns based on Gray codes.

12. The apparatus according to claim 1, wherein the object is a translucent object.

13. The apparatus according to claim 1, further comprising:
    a projection unit configured to project each of the first pattern and the second pattern; and
    an image capturing unit configured to capture the first captured images of the space onto which the first pattern has been projected, and the second captured images of the space onto which the second pattern has been projected.

14. A three-dimensional-shape measurement apparatus comprising:
one or more processors; and
one or more memories coupled to the one or more processors and having instructions stored thereon which, when executed by the one or more processors, cause the three-dimensional-shape measurement apparatus to:
acquire first captured images of a space onto which a first pattern formed from a bright portion and a dark portion has been projected;
acquire second captured images of the space onto which has been projected a second pattern formed from a bright portion and a dark portion and having a boundary position between the bright portion and the dark portion that is different from a boundary position between the bright portion and the dark portion of the first pattern;
select, for each of at least one predetermined region of the first captured images or the second captured images, based on a luminance value in the first captured images and a luminance value in the second captured images, one of the first captured images and the second captured images containing the at least one predetermined region as a selection image to be used for three-dimensional-shape measurement; and
perform three-dimensional-shape measurement of an object included in the space based on the selection image,
wherein:
the first pattern includes a plurality of patterns each formed from a bright portion and a dark portion, a width of at least one of the bright portion and the dark portion being different between different patterns,
the first captured images indicate a group of captured images obtained by capturing the plurality of patterns included in the first pattern,
the second pattern includes a plurality of patterns each formed from a bright portion and a dark portion, wherein a boundary position between the bright portion and the dark portion in each of the plurality of patterns included in the second pattern is different from a boundary position between the bright portion and the dark portion in each of the plurality of patterns included in the first pattern, and
the second captured images indicate a group of captured images obtained by capturing the plurality of patterns included in the second pattern.

15. The apparatus according to claim 14, wherein the first pattern and the second pattern are patterns based on Gray codes.

16. The apparatus according to claim 14, wherein the object is a translucent object.

17. A three-dimensional-shape measurement method comprising:
acquiring first captured images of a space onto which a first pattern formed from a bright portion and a dark portion has been projected;
acquiring second captured images of the space onto which has been projected a second pattern formed from a bright portion and a dark portion and having a boundary position between the bright portion and the dark portion that is different from a boundary position between the bright portion and the dark portion of the first pattern;
selecting, for each predetermined region of the first captured images or the second captured images, based on a luminance value in the first captured images and a luminance value in the second captured images, one of the first captured images and the second captured images as a selection image to be used for three-dimensional shape measurement; and
performing three-dimensional shape measurement of an object included in the space based on the selection image;
wherein the first captured images include a first non-inverted image as a captured image of the space onto which the first pattern has been projected and a first inverted image as a captured image of the space onto which a first reversed pattern obtained by inverting the bright portion and the dark portion of the first pattern has been projected, and
wherein the second captured images include a second non-inverted image as a captured image of the space onto which a second pattern has been projected and a second inverted image as a captured image of the space onto which a second reversed pattern obtained by inverting the bright portion and the dark portion of the second pattern has been projected.

18. A non-transitory computer-readable storage medium storing a computer program for causing a computer to:
acquire first captured images of a space onto which a first pattern formed from a bright portion and a dark portion has been projected;
acquire second captured images of the space onto which has been projected a second pattern formed from a bright portion and a dark portion and having a boundary position between the bright portion and the dark portion, that is different from a boundary position between the bright portion and the dark portion of the first pattern;
select, for each predetermined region of the first captured images or the second captured images, based on a luminance value in the first captured images and a luminance value in the second captured images, one of the first captured images and the second captured images as a selection image to be used for three-dimensional shape measurement; and
perform three-dimensional shape measurement of an object included in the space based on the selection image,
wherein the first captured images include a first non-inverted image as a captured image of the space onto which the first pattern has been projected and a first inverted image as a captured image of the space onto which a first reversed pattern obtained by inverting the bright portion and the dark portion of the first pattern has been projected, and
wherein the second captured images include a second non-inverted image as a captured image of the space onto which the second pattern has been projected and a second inverted image as a captured image of the space onto which a second reversed pattern obtained by inverting the bright portion and the dark portion of the second pattern has been projected.

* * * * *